US012722382B2

(12) United States Patent
Hanano

(10) Patent No.: US 12,722,382 B2
(45) Date of Patent: Sep. 1, 2026

(54) INKJET IMAGE FORMING APPARATUS CAPABLE OF SUPPRESSING ERRONEOUS OPERATION WHEN CONNECTING JOINT TO DISCHARGE PORT OF INK CONTAINER

(71) Applicant: KYOCERA Document Solutions Inc., Osaka (JP)

(72) Inventor: Susumu Hanano, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 225 days.

(21) Appl. No.: 18/819,773

(22) Filed: Aug. 29, 2024

(65) Prior Publication Data

US 2025/0074064 A1 Mar. 6, 2025

(30) Foreign Application Priority Data

Aug. 30, 2023 (JP) ................................ 2023-139900

(51) Int. Cl.
*B41J 2/175* (2006.01)
*B41J 29/13* (2006.01)

(52) U.S. Cl.
CPC ......... *B41J 2/17523* (2013.01); *B41J 2/1752* (2013.01); *B41J 29/13* (2013.01); *B41J 2002/17516* (2013.01)

(58) Field of Classification Search
CPC ...... B41J 2/17523; B41J 2/1752; B41J 29/13; B41J 2002/17516
See application file for complete search history.

(56) References Cited

U.S. PATENT DOCUMENTS

| | | | | |
|---|---|---|---|---|
| 2015/0321481 | A1* | 11/2015 | Ishizawa | B41J 2/17533 347/86 |
| 2016/0221349 | A1* | 8/2016 | Aoki | B41J 2/17553 |
| 2020/0122472 | A1 | 4/2020 | Maeshima | |
| 2025/0018719 | A1* | 1/2025 | Suzuki | B41J 2/175 |
| 2025/0033363 | A1* | 1/2025 | Sato | B41J 29/58 |
| 2025/0042165 | A1* | 2/2025 | Hanano | B41J 29/13 |

FOREIGN PATENT DOCUMENTS

| | | |
|---|---|---|
| JP | 2020066140 A | 4/2020 |

* cited by examiner

*Primary Examiner* — Justin Seo
(74) *Attorney, Agent, or Firm* — Alleman Hall LLP

(57) ABSTRACT

An image forming apparatus includes an ink container, a tube, a joint, a tray, and a handle. The ink container stores ink to be supplied to an inkjet head. The tube connects the ink container and the inkjet head. The joint is provided at one end of the tube and is removably connected to a discharge port of the ink container. The tray is inserted into and removed from a storage portion along a pull-out direction, and the ink container is placed with the discharge port facing toward the front in the pull-out direction. The handle is provided on a surface of the tray on the front side in the pull-out direction. The handle is arranged rearward of the tube or the joint in the pull-out direction in a state in which the ink container is stored in the storage portion and the joint is connected to the discharge port.

2 Claims, 6 Drawing Sheets

INKJET IMAGE FORMING APPARATUS CAPABLE OF SUPPRESSING ERRONEOUS OPERATION WHEN CONNECTING JOINT TO DISCHARGE PORT OF INK CONTAINER

INCORPORATION BY REFERENCE

This application is based upon and claims the benefit of priority from the corresponding Japanese Patent Application No. 2023-139900 filed on Aug. 30, 2023, the entire contents of which are incorporated herein by reference.

BACKGROUND

The present disclosure relates to an inkjet image forming apparatus that forms an image using ink supplied from an ink container.

In an inkjet image forming apparatus, ink is supplied to an inkjet head from an ink container. The inkjet head and the ink container are connected by a tube. One end of the tube is fixed to the inkjet head. A joint that is detachably connected to a discharge port of the ink container is attached to an other end of the tube.

Generally, ink containers are mounted on a tray that can be pulled out from a storage portion. When the tray is pulled out to replace the ink container, the discharge port of the ink container is separated from the joint. When a new ink container is placed on the tray and the tray is pushed into the storage portion, the discharge port of the ink container is automatically connected to the joint.

SUMMARY

An image forming apparatus according to the present disclosure includes an ink container, a tube, a joint, a tray, and a handle. The ink container stores ink to be supplied to an inkjet head. The tube connects the ink container and the inkjet head. The joint is provided at one end of the tube and is removably connected to a discharge port of the ink container. The tray is inserted into and removed from a storage portion along a predetermined pull-out direction, and the ink container is placed with the discharge port facing toward the front in the pull-out direction. The handle is provided on a surface of the tray on the front side in the pull-out direction. The handle is arranged rearward of the tube or the joint in the pull-out direction in a state in which the ink container is stored in the storage portion and the joint is connected to the discharge port.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an inkjet image forming apparatus of an embodiment according to the present disclosure will be described with reference to the drawings.

Figure 1:
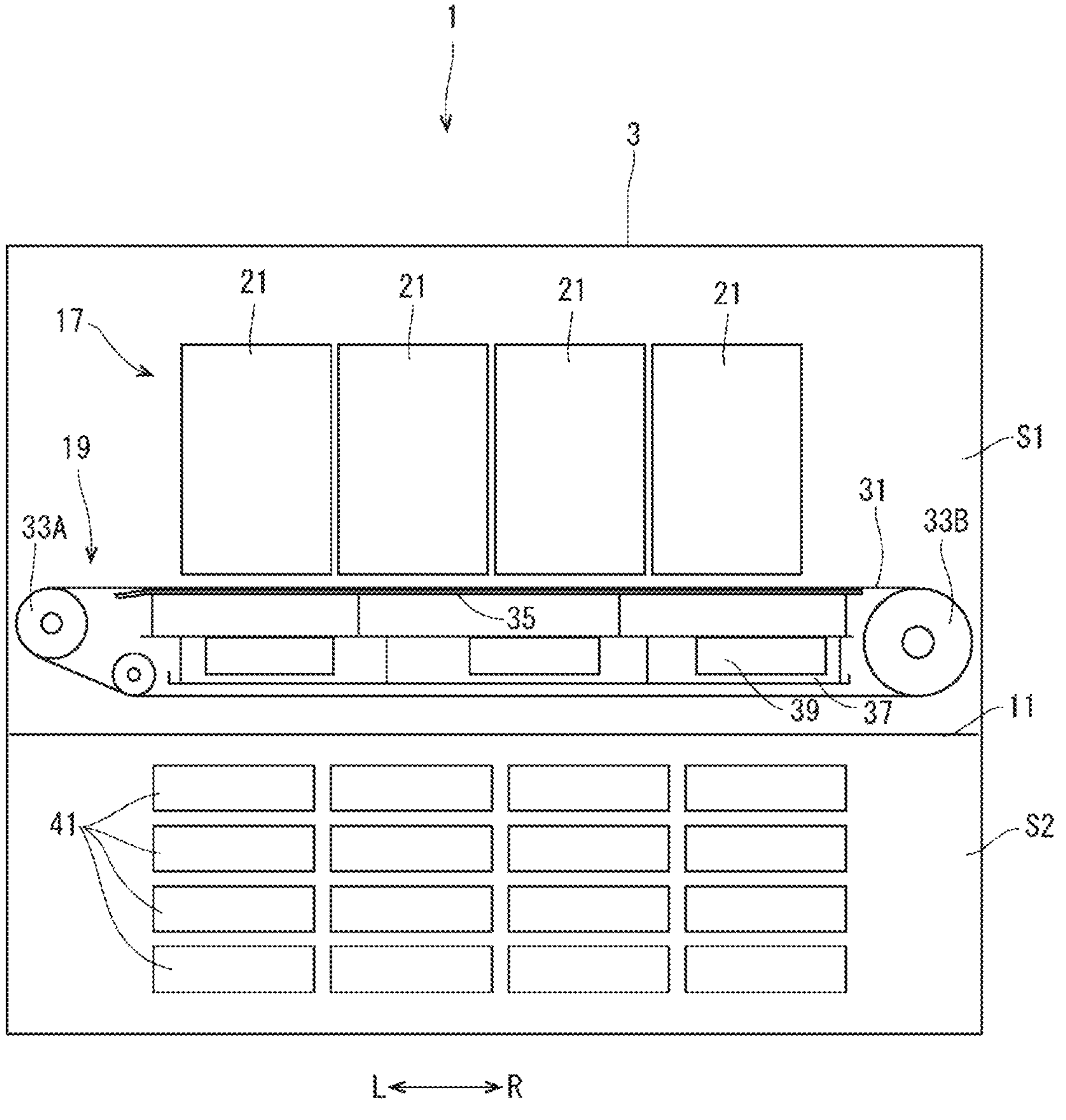
FIG. 1 is a front view schematically showing an internal configuration of an inkjet image forming apparatus of an embodiment according to the present disclosure.

First, an overall configuration of an inkjet image forming apparatus 1 will be described with reference to FIG. 1. FIG. 1 is a front view schematically showing an internal configuration of the image forming apparatus 1. In each figure, L, R, Fr, and Rr indicate left, right, front, and rear, respectively.

Figure 2:
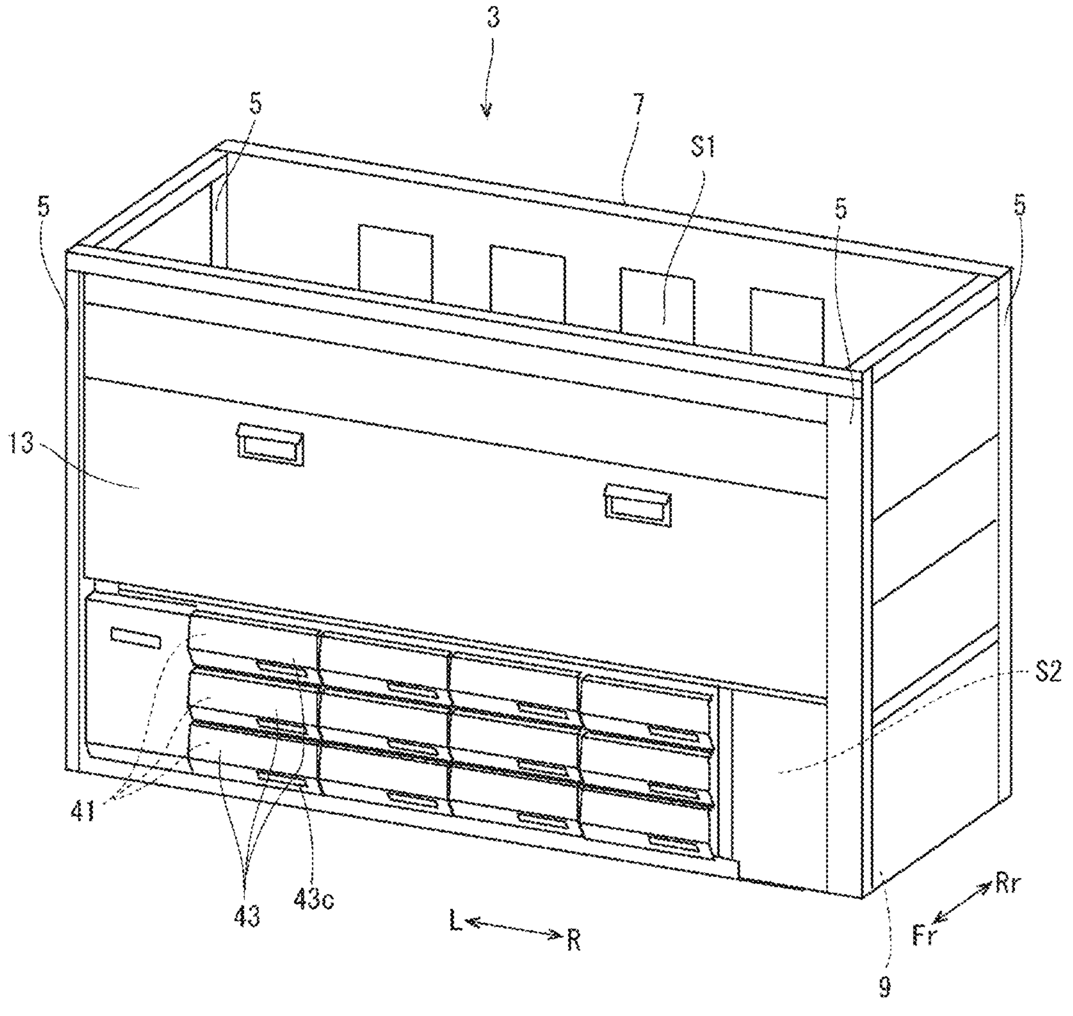
FIG. 2 is a perspective view showing a housing of an inkjet image forming apparatus of an embodiment according to the present disclosure.

The inkjet image forming apparatus 1 includes a housing 3 having a rectangular parallelepiped hollow portion. The housing 3 will be described with reference to FIG. 2. FIG. 2 is a perspective view showing the housing 3. The housing 3 has four support pillars 5 arranged at each of the four corners (front left corner, front right corner, rear left corner, and rear right corner) of the hollow portion, a rectangular upper frame body 7 connected to upper ends of the four support pillars 5, and a rectangular lower frame body 9 connected to lower ends of the four support pillars 5. The hollow portion is divided into an upper hollow portion S1 and a lower hollow portion S2 by a partition plate 11 along a horizontal plane (see also FIG. 1).

First, the upper hollow portion S1 will be described. The upper hollow portion S1 is surrounded on all four sides by front and rear side plates and left and right side plates. An opening (not shown) that is long in the left-right direction is formed in the front side plate. The opening is closed by an upper cover 13 so as to be able to be opened and closed. As shown in FIG. 1, a head unit 17 and a conveying unit 19 are housed in the upper hollow portion S1. The head unit 17 is housed in an upper part of the upper hollow portion S1. The conveying unit 19 is housed in a lower part of the upper hollow portion S1 through the opening in the front side panel.

First, the head unit 17 will be described with reference to FIG. 1. The head unit 17 includes four inkjet heads 21 corresponding to yellow, black, cyan and magenta inks. The four inkjet heads 21 are arranged at predetermined intervals in the left-right direction. Each inkjet head 21 includes three recording heads and a plate (not shown) that supports the three recording heads.

Each recording head includes a large number of nozzles (not shown) through which ink is supplied, and a piezoelectric element (not shown) provided for each nozzle. Ejection openings of the large number of nozzles are open on a bottom surface of the recording head. By the piezoelectric element being driven, ink in the nozzle is ejected downward from the ejection opening.

Next, the conveying unit 19 will be described with reference to FIG. 1. The conveying unit 19 includes an endless conveying belt 31, and a drive roller 33A and a driven roller 33B around which the conveying belt 31 is wound. A large number of through holes that penetrate the conveying belt 31 in the thickness direction are formed in the conveying belt 31. Rotation of the drive roller 33A causes the conveying belt 31 to run in a counterclockwise direction in FIG. 1. A recording medium is conveyed in a conveying direction from right to left in FIG. 1 by the conveying belt 31 that travels along an upper running track.

In a hollow portion of the conveying belt 31, a conveying plate 35, a plurality of suction chambers 37, and a plurality of suction devices 39 are arranged. The conveying plate 35 is arranged between the rollers 33A, 33B so as to come into contact with an inner surface of the conveying belt 31 that runs along the upper running track. The conveying plate 35 has a large number of through holes penetrating in the thickness direction. The plurality of suction chambers 37 are arranged below the conveying plate 35 along the conveying direction. The suction devices 39 are arranged in the suction chambers 37 and generate a negative pressure in the suction chambers 37. When there is negative pressure in the suction chamber 37, negative pressure is generated between the through holes of the conveying plate 35 and the through holes of the conveying belt 31 that runs along the upper running track, and the recording medium is attracted to the transport belt 31.

Figure 3:
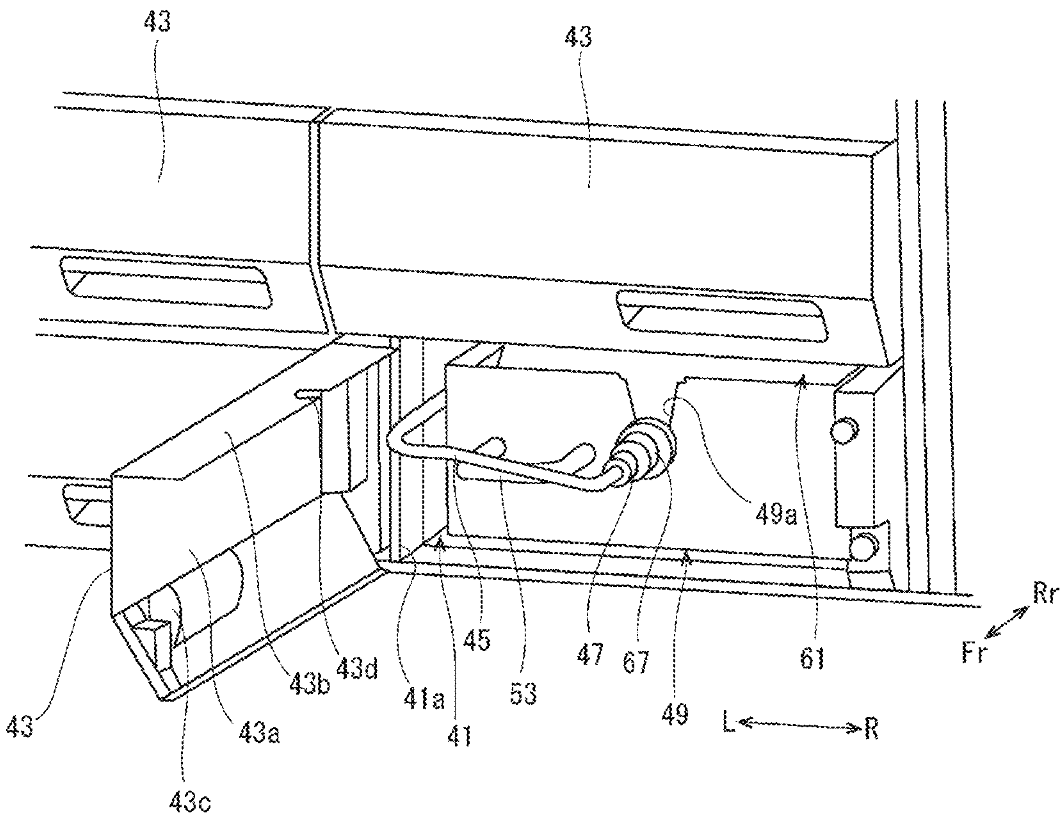
FIG. 3 is a perspective view showing a state in which a cover of a storage portion is open in an inkjet image forming apparatus of an embodiment according to the present disclosure.
Figure 4:
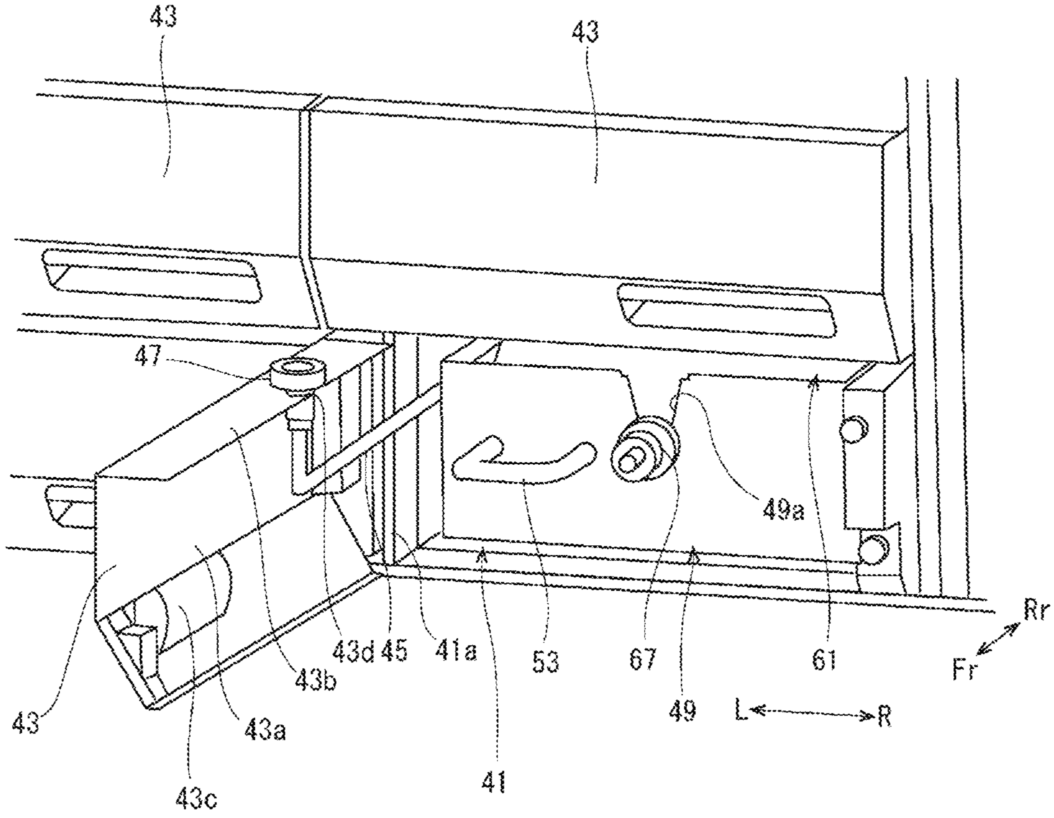
FIG. 4 is a perspective view showing a state in which a joint is removed from a discharge port of an ink container in an inkjet image forming apparatus of an embodiment according to the present disclosure.
Figure 5:
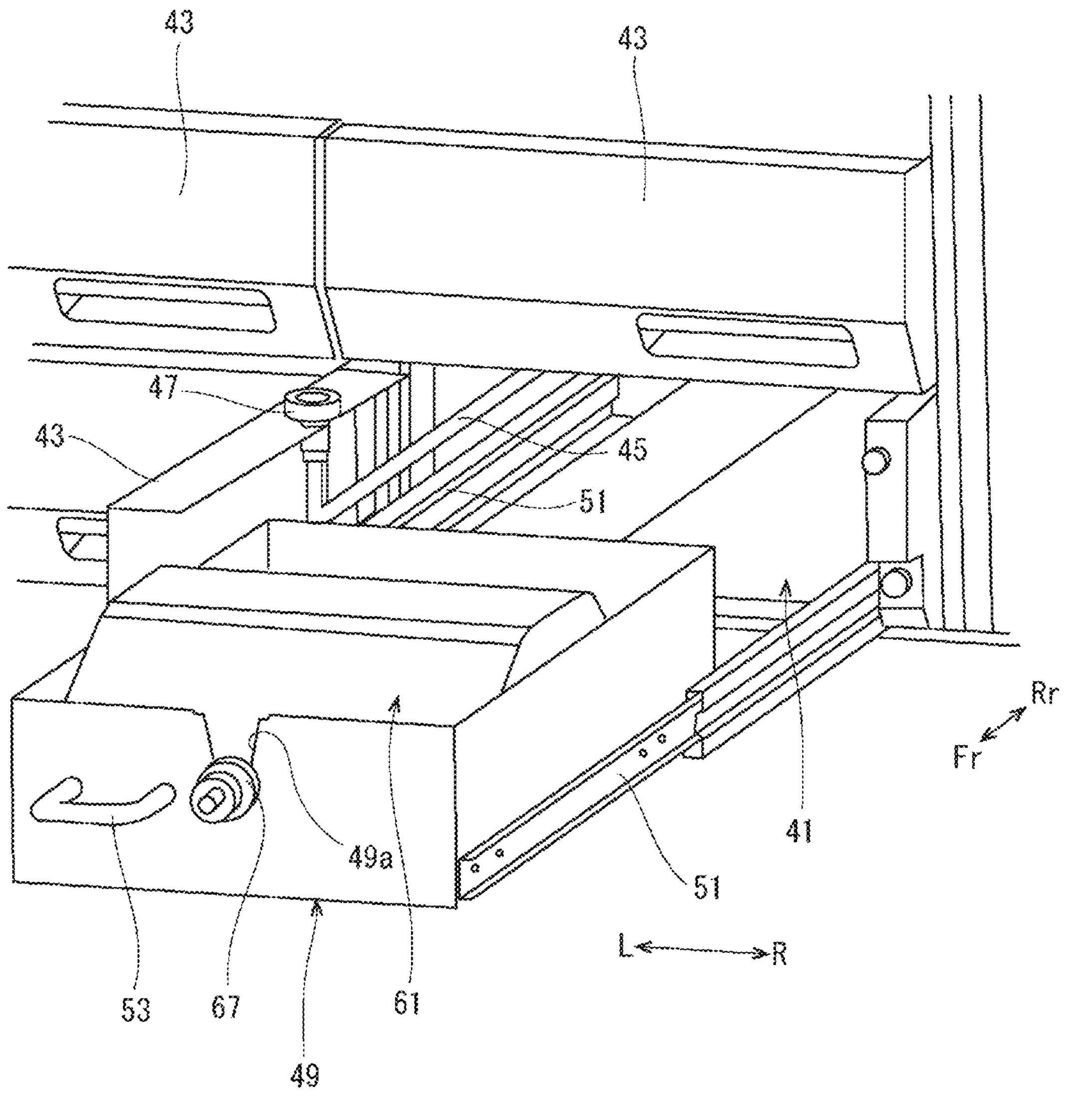
FIG. 5 is a perspective view showing a state in which a tray is pulled out in an inkjet image forming apparatus of an embodiment according to the present disclosure.

Next, the lower hollow portion S2 will be described with reference to FIG. 2 and also to FIGS. 3 to 5. FIGS. 3 to 5 are perspective views showing the storage portion 41 provided in the lower hollow portion S2. The lower hollow portion S2 is provided with the storage portions 41 that house the ink containers that contain ink to be supplied to the recording heads of the inkjet heads 21 of the head unit 17 and a cleaning liquid container that contains cleaning liquid for cleaning the nozzle surfaces of the recording heads.

The left and right side surfaces and the rear surface of the lower hollow portion S2 are covered by left and right side plates and a rear plate. The lower hollow portion S2 is provided with twelve storage portions 41. More specifically, as shown in FIG. 2, the storage portions 41 are arranged in three rows in the vertical direction and four rows in the horizontal direction. Each storage portion 41 is a rectangular hollow portion surrounded by a top plate and a bottom plate opposed in the vertical direction, left and right side plates opposed in the horizontal direction, and a rear plate, and has an opening 41*a* (see FIGS. 3 to 5) on the front side.

Figure 6:
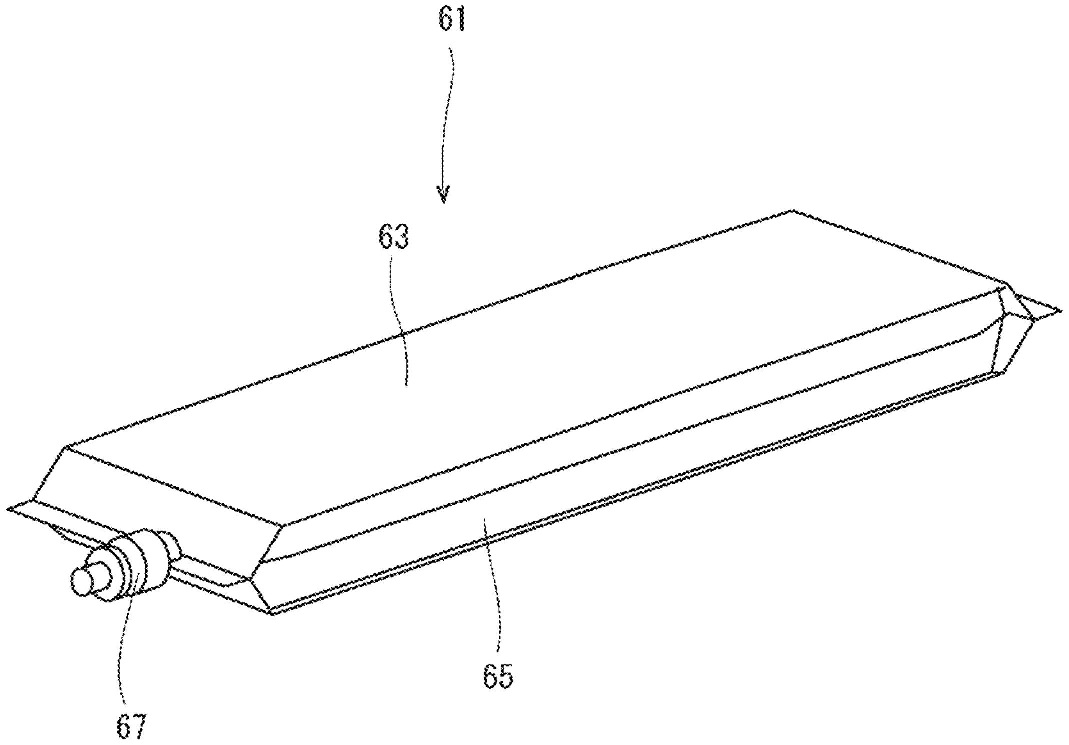
FIG. 6 is a perspective view showing an ink container in an inkjet image forming apparatus of an embodiment according to the present disclosure.

In the inkjet image forming apparatus 1, ink is supplied to the inkjet head 21 from ink container 61 (see FIG. 6). The inkjet head 21 and the ink container 61 are connected by a tube 45 (see FIG. 3). One end of the tube 45 is fixed to the inkjet head 21. A joint 47 (see FIG. 3) that is removably connected to a discharge port 67 (see FIG. 6) of the ink container 61 is attached to an other end of the tube 45.

In a conventional inkjet image forming apparatus, the ink container 61 is placed on a tray 49 (see FIG. 5) that can be pulled out from the storage portion 41. When the tray 49 is pulled out to replace the ink container 61, the discharge port 67 of the ink container 61 moves away from the joint 47. When a new ink container 61 is placed on the tray 49 and the tray 49 is pushed into the storage portion 41, the discharge port 67 of the ink container 61 is automatically connected to the joint 47.

In this manner, in the conventional ink jet image forming apparatus, the discharge port 67 of the ink container 61 and the joint 47 are connected by pushing the tray 49 into the storage portion 41. In this case, the discharge port 67 and the joint 47 are arranged on a far side (rear side) of the ink container 61 as viewed from the user, and thus checking whether or not the two are properly connected is difficult. Therefore, in a case in which the axial centers of the discharge port 67 and the joint 47 are misaligned or in a case in which the tray 49 is not pushed in with sufficient force, a connection failure will occur, resulting in problems such as ink leakage.

On the other hand, in a case in which a user manually connects the joint 47 to the discharge port 67, it is easy for an erroneous operation to occur, such as pulling the tray 49 out of the storage portion 41 without disconnecting the joint 47, or conversely, pushing the tray 49 into the storage portion 41 without connecting the joint 47.

In contrast, in the inkjet image forming apparatus 1 of the present embodiment according to the disclosure, as will be described below, it is possible to suppress erroneous operation when connecting the joint 47 to the discharge port 67 of the ink container 61.

As shown in FIGS. 3 and 4, an opening 41*a* on a front surface of the storage portion 41 is opened and closed by a cover 43. The cover 43 is rotatably supported on a rotation fulcrum provided on a left side plate of the storage portion 41. The cover 43 has a front plate 43*a* capable of closing the opening 41*a*, and an upper plate 43*b* bent rearward (toward the inside of the storage portion 41) from an upper edge of the front plate 43*a*. A lower half of the front plate 43*a* is inclined rearward. A recessed handle 43*c* is formed on the inclined lower half. In addition, a notch 43*d* is formed in the upper plate 43*b*, extending forward from a rear edge.

As shown in FIGS. 3 to 5, the storage portion 41 supports a flexible tube 45 that connects to the corresponding inkjet head 21. The tube 45 extends from the inkjet head 21 through the partition plate 11 of the housing 3 into the lower hollow portion S2, then passes through the rear plate of the storage portion 41 and extends forward along an inner surface of the left plate of the storage portion 41. The tip end of the tube 45 is provided with a joint 47 that can be connected to the discharge port of the ink container 61, which will be described later.

As shown in FIG. 4, the joint 47 can be removably supported by the cover 43 by being hooked in a notch 43*d* formed in the upper plate 43*b* of the cover 43 with a connecting port facing upward. At this time, an upper end portion of the joint 47 protrudes upward beyond the upper plate 43*b* of the cover 43. In this manner, the notch 43*d* is an example of a support portion according to the present disclosure that supports the joint 47 when removed from the discharge port of the ink container so that a portion of the joint 47 protrudes from the cover 43.

As shown in FIG. 5, each storage portion 41 supports a tray 49 on which an ink container is placed. The tray 49 is formed in a box shape with an open top, and has a bottom plate, front and rear side plates opposed to each other in a front-rear direction, and left and right side plates opposed to each other in a left-right direction. The left and right side plates of the tray 49 are supported by the left and right side plates of the storage portion 41 by left and right rails 51 with retraction mechanisms that extend along the front-rear direction. The tray 49 can be completely pulled out from the storage portion 41 by moving the tray 49 forward along the left and right rails 51. On the other hand, the tray 49 is stored in the storage portion 41 by moving the tray 49 rearward along the left and right rails 51.

The front side plate of the tray 49 is formed with a notch 49*a* extending downward from the upper edge. A width of the notch 49*a* becomes narrow in the downward direction. Furthermore, a handle 53 is formed on the front side plate of the tray 49 further on the left side than a lower end portion of the notch 49*a* (on the left side plate side of the storage section 41).

Next, the ink container 61 will be described with reference to FIG. 6. FIG. 6 is a perspective view showing the ink container 61. The ink container 61 is formed into a gusseted bag shape by joining edge portions of upper and lower films 63 and left and right films 65. A cylindrical discharge port 67 for discharging ink to the outside is provided at one joining portion between the upper and lower films 63. The discharge port 67 is provided with an opening/closing valve (not shown) that prevents the ink from flowing out. When the joint 47 provided at the tip end of the tube 45 is connected to the discharge port 67, the opening/closing valve is pressed by the joint 47, and an inner portion of the ink container 61 and the tube 45 communicate with each other via the discharge port 67.

An example of a replacement operation of the ink container 61 in the inkjet image forming apparatus 1 having the above-mentioned configuration will be described with reference to FIGS. 3 to 5. As described above, the ink container 61 is supported by the tray 49 and stored in the storage portion 41. More specifically, as shown in FIG. 3, the ink container 61 is placed on the tray 49 with the discharge port 67 facing forward, and the discharge port 67 is inserted from above into the notch 49*a* in the front plate of the tray 49. In this way, the discharge port 67 faces forward (forward in the direction in which the tray 49 is pulled out). A joint 47 provided at the tip end of the tube 45 is connected to the discharge port 67. That is, the tube 45 is arranged along an inner surface of the left side plate of the storage portion 41 and an outer surface of the front plate of the tray 49, and the joint 47 is connected to the discharge port 67 from the front.

When the ink container 61 becomes empty, for example, a command to replace the ink container is displayed on a display portion of the image forming apparatus 1. Then, a user first opens the cover 43 as shown in FIG. 3. Next, the user removes the joint 47 from the discharge port 67 and temporarily hooks the removed joint 47 onto the notch 43*d* of the cover 43 as shown in FIG. 4. When the joint 47 is removed, the discharge port 67 is closed by the opening/closing valve.

After that, as shown in FIG. 5, the user grasps the handle 53 and pulls the tray 49 forward from the storage portion 41 through the opening 41*a*. The user then removes the empty ink container 61 from the tray 49 and places a new ink container 61 on the tray 49. The user pushes the tray 49 into the storage portion 41, removes the joint 47 from the cover 43 and connects the joint 47 to the discharge port 67 of the ink container 61. At this time, the discharge port 67 is fixed and stabilized in the notch 49*a* in the front plate of the tray 49, and thus the joint 47 can be easily connected. Finally, the user closes the cover.

The ink container 61 is replaced as described above; however, for example, after opening the cover 43 (as shown in FIG. 3), the user may mistakenly try to pull out the tray 49 without disconnecting the joint 47. In this case, as shown in FIG. 3, the handle 53 of the tray 49 is arranged behind the tube 45 (rear in the direction in which the tray 49 is pulled out), and thus, in this state it is difficult to grasp the handle 53. Therefore, the user notices that the tube 45 is present in front of the handle 53, that is, the joint 47 has not been removed from the discharge port 67.

In addition, there may be a case in which the user forgets to connect the joint 47 to the discharge port 67 after replacing the ink container 61. In this case, when the user pushes the tray 49 into the storage portion 41 without connecting the joint 47 and attempts to close the cover 43, the joint 47 supported by the cover 43 will interfere with the upper portion of the opening of the storage portion 41 (the upper plate of the storage portion 41 or the cover 43 of the upper storage portion 41), and the cover 43 cannot be closed. Thus, the user recognizes that the joint 47 is not connected to the discharge port 67.

As described above, according to the present disclosure, the handle 53 of the tray 49 is located on the rear side of the tube 45 connected to the ink container 61, and thus the tray 49 cannot be pulled out unless the joint 47 is removed from the discharge port 67. Therefore, it is possible to prevent the tray 49 from being pulled out with the joint 47 still connected to the discharge port of the ink container 61.

In the present embodiment, an example in which the handle 53 is arranged behind the tube 45 has been described; however, for example, in a case in which the joint 47 is L-shaped, the handle 53 may be arranged behind the joint 47.

Furthermore, in a state in which the joint 47 remains supported on the cover 43, the cover 43 cannot be closed. In other words, unless the joint 47 is connected to the discharge port 67, the cover 43 cannot be closed. Therefore, forgetting to connect the joint 47 can be reliably prevented.

Note that the above-described embodiment illustrates one aspect of the image forming apparatus according to the present disclosure, and the technical scope of the present disclosure is not limited to the above-described embodiment.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:
- an ink container configured to store ink to be supplied to an inkjet head;
- a tube configured to connect the ink container and the inkjet head;
- a joint provided at one end of the tube and configured to be removably connected to a discharge port of the ink container;
- a tray configured to be inserted into and removed from a storage portion along a predetermined pull-out direction, and on which the ink container is placed with the discharge port facing a front side in the pull-out direction; and
- a handle provided on a surface of the tray on the front side in the pull-out direction; wherein
- the handle is arranged rearward of the tube or the joint in the pull-out direction in a state in which the ink container is stored in the storage portion and the joint is connected to the discharge port.

2. The image forming apparatus according to claim 1 further comprising
- a cover configured to open and close an opening of the storage portion; wherein
- the cover includes a support portion configured to support the joint removed from the discharge port of the ink container so that a part of the joint protrudes from the cover; and
- in a state in which the joint is supported by the support portion, a portion of the joint protruding from the cover interferes with the opening, making it impossible for the cover to close the opening.

* * * * *